UNITED STATES PATENT OFFICE.

CHARLES N. WAITE, OF CRANFORD, NEW JERSEY, ASSIGNOR TO CELLULOSE PRODUCTS COMPANY, OF WILMINGTON, DELAWARE, A CORPORATION OF DELAWARE.

ART OF MAKING FILMS.

SPECIFICATION forming part of Letters Patent No. 690,211, dated December 31, 1901.

Application filed May 7, 1901. Serial No. 59,096. (No specimens.)

*To all whom it may concern:*

Be it known that I, CHARLES N. WAITE, of Cranford, in the county of Union and State of New Jersey, have invented an Improvement in the Art of Making Films, of which the following is a specification.

It is well known that films, sheets, &c., composed, essentially, of cellulose, amorphous cellulose, or cellulose compounds—such, for instance, as the esters, as cellulose nitrate and cellulose acetate—are apt to become hard and brittle, the sheets made of cellulose or amorphous cellulose showing this brittleness when dry and the sheets mades of the esters, as the nitrates and acetates, growing similarly brittle with evaporation of the solvent or agglomerating agent used in their manufacture.

This invention has for its object the production of films, sheets, &c., of cellulose, amorphous cellulose, or cellulose compounds which will not become hard and brittle. I have discovered that this brittleness may be overcome and the films, sheets, &c., maintained indefinitely in a tough and pliable condition by the addition to the material of lactic acid.

In case of cellulose or amorphous cellulose films, sheets, &c., I soak the cellulose or amorphous cellulose in a solution of lactic acid of varying strength, depending upon the degree of the flexibility or softness desired. I prefer to use a solution containing, say, from five to fifteen per cent. of lactic acid. After the solution has penetrated the mass the object is removed and dried and finished in the usual way.

In case of films, sheets, &c., to be formed of cellulose compounds—such as the esters, as the nitrates or acetates of cellulose—I add pure lactic acid directly to the solution of the compound or incorporate the acid with the compound while the latter is in a plastic state. The effect of the addition of the lactic acid is to maintain the finished article in a tough and flexible condition.

I claim—

1. The process herein described of rendering cellulose or cellulose compounds, permanently tough and flexible, which consists in impregnating the cellulose or cellulose compound with lactic acid.

2. As a new article of manufacture, amorphous cellulose containing lactic acid, substantially as set forth.

3. As a new article of manufacture, the combination of a cellulose ester and lactic acid, substantially as described.

4. As a new article of manufacture, cellulose nitrates containing lactic acid, substantially as described.

5. As a new article of manufacture, cellulose acetates containing lactic acid, substantially as described.

In testimony whereof I have signed my name to this specification in the presence of two subscribing witnesses.

CHARLES N. WAITE.

Witnesses:
B. J. NOYES,
JOHN W. DECROW.